(12) United States Patent
Quell et al.

(10) Patent No.: US 12,509,547 B2
(45) Date of Patent: Dec. 30, 2025

(54) SYNTHESIS OF LINEAR POLYOXAZOLIDINONES USING URETDIONES AS DIISOCYANATE COMPONENT

(71) Applicant: BASF SE, Ludwigshafen am Rhein (DE)

(72) Inventors: Aggeliki Quell, Ludwigshafen am Rhein (DE); Hans-Josef Thomas, Korschenbroich (DE); Berend Eling, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 325 days.

(21) Appl. No.: 18/006,012

(22) PCT Filed: Jul. 22, 2021

(86) PCT No.: PCT/EP2021/070549
§ 371 (c)(1),
(2) Date: Jan. 19, 2023

(87) PCT Pub. No.: WO2022/018211
PCT Pub. Date: Jan. 27, 2022

(65) Prior Publication Data
US 2023/0348657 A1 Nov. 2, 2023

(30) Foreign Application Priority Data
Jul. 23, 2020 (EP) .................................... 20187451

(51) Int. Cl.
| | | |
|---|---|---|
| *C08G 59/40* | (2006.01) | |
| *C08G 18/00* | (2006.01) | |
| *C08G 18/08* | (2006.01) | |
| *C08G 18/09* | (2006.01) | |
| *C08G 18/10* | (2006.01) | |
| *C08G 18/20* | (2006.01) | |
| *C08G 18/71* | (2006.01) | |
| *C08G 18/76* | (2006.01) | |
| *C08G 18/79* | (2006.01) | |
| *C08G 59/68* | (2006.01) | |

(52) U.S. Cl.
CPC ....... *C08G 59/4028* (2013.01); *C08G 18/003* (2013.01); *C08G 18/0852* (2013.01); *C08G 18/097* (2013.01); *C08G 18/10* (2013.01); *C08G 18/2018* (2013.01); *C08G 18/2027* (2013.01); *C08G 18/71* (2013.01); *C08G 18/714* (2013.01); *C08G 18/7621* (2013.01); *C08G 18/798* (2013.01); *C08G 59/686* (2013.01)

(58) Field of Classification Search
CPC ............. C08G 59/4028; C08G 59/686; C08G 18/003; C08G 18/0852; C08G 18/097; C08G 18/10; C08G 18/2027; C08G 18/714; C08G 18/7621; C08G 18/798; C08G 18/2018; C08G 18/71
See application file for complete search history.

(56) References Cited

U.S. PATENT DOCUMENTS

| | | | | |
|---|---|---|---|---|
| 4,138,372 | A * | 2/1979 | Nishikawa | ........... C08G 18/003 528/73 |
| 11,180,603 | B2 * | 11/2021 | Thomas | ............. C08G 18/2045 |
| 2017/0088659 | A1 | 3/2017 | Müller et al. | |
| 2019/0359757 | A1 | 11/2019 | Thomas et al. | |
| 2021/0253782 | A1 | 8/2021 | Desbois et al. | |

FOREIGN PATENT DOCUMENTS

| | | | |
|---|---|---|---|
| EP | 3 456 754 | 3/2019 | |
| EP | 3 604 370 | 2/2020 | |
| JP | 51-102100 | 9/1976 | |
| JP | 2020-508359 | 3/2020 | |
| WO | 2018/149844 | 8/2018 | |
| WO | 2019/052991 | 3/2019 | |
| WO | 2020/016276 | 1/2020 | |
| WO | WO-2020025805 A1 * | 2/2020 | .......... B01J 31/0204 |

OTHER PUBLICATIONS

Altmann et al., "Synthesis of Linear Poly(oxazolidin-2-one)s by Cooperative Catalysis Based on N-Heterocyclic Carbenes and Simple Lewis Acids", Macromolecules, vol. 52, 2019, pp. 487-494.

(Continued)

*Primary Examiner* — Rabon A Sergent
(74) *Attorney, Agent, or Firm* — Grüneberg and Myers PLLC

(57) ABSTRACT

A process for preparing a thermoplastic polymer involves reacting at least components (a) to (b), in the presence of a catalyst composition (c). Component (a) is an isocyanate composition containing at least one uretdione diisocyanate (a-i), and component (b) is an epoxide composition containing at least one diepoxide (b-i). The catalyst composition (c) contains at least one ionic liquid (c-i), preferably selected from 1-ethyl-3-methyl imidazolium bromide, 1-benzyl-3-methyl imidazolium chloride, 1-butyl-1-methylpiperidinium chloride, 1-ethyl-2,3-dimethylimidazolium bromide, 1-(2-hydroxyethyl)-3-methyl imidazolium chloride, butyl-1-methylpiperidinium acetate, or mixtures of two or more thereof. A thermoplastic polymer obtained or obtainable from the process is useful for the preparation of a fibre or a molded article or as a modifier for another thermoplastic material.

17 Claims, 2 Drawing Sheets

(56) References Cited

OTHER PUBLICATIONS

International Search report issued Oct. 5, 2021, in PCT/EP2021/070549, 4 pages.
International Preliminary Report on Patentability issued Feb. 2, 2023, in PCT/EP2021/070549, 9 pages.
Pankratov et al., "2-Oxazolidinones", Russian Chemical Reviews, vol. 52, No. 6, 1983, pp. 576-593.
Written Opinion issued Oct. 5, 2021, in PCT/EP2021/070549, 7 pages.
Japanese Office Action issued in JP patent application No. 2023-504558, issued Apr. 16, 2025 (with English translation), 8 pages.

\* cited by examiner

SYNTHESIS OF LINEAR POLYOXAZOLIDINONES USING URETDIONES AS DIISOCYANATE COMPONENT

CROSS-REFERENCE TO RELATED APPLICATIONS

This application is the National Stage entry under § 371 of International Application No. PCT/EP2021/070549, filed on Jul. 22, 2021, and which claims the benefit of priority to European Application No. 20187451.8, filed on Jul. 23, 2020. The content of each of these applications is hereby incorporated by reference in its entirety.

BACKGROUND OF THE INVENTION

Field of the Invention

The invention relates in a first aspect to a process for preparing a thermoplastic polymer comprising reacting at least components (a) to (b), wherein (a) is an isocyanate composition comprising at least one uretdione diisocyanate (a-i); and (b) is an epoxide composition comprising at least one diepoxide (b-i); in the presence of a catalyst composition (c), wherein the catalyst composition (c) comprises at least one ionic liquid (c-i), preferably selected from the group of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (EDMIM-Br), 1-(2-hydroxyethyl)-3-methyl imidazolium chloride (HEMIM-Cl), butyl-1-methylpiperidinium acetate (BMPM acetate), and mixtures of two or more thereof.

In a second aspect, the invention relates to a thermoplastic polymer obtained or obtainable from the process according to the first aspect. Thus, the invention relates to a thermoplastic polymer obtained or obtainable from the reaction of at least (a) an isocyanate composition comprising at least one uretdione diisocyanate (a-i); and (b) an epoxide composition comprising at least one diepoxide (b-i); in the presence of a catalyst composition (c).

A third aspect of the invention is the use of a thermoplastic polymer obtained or obtainable from the process according to the first aspect or of the thermoplastic polymer of the second aspect for the preparation of a fibre or a molded article or as a modifier for another thermoplastic mate rial.

Description of Related Art

Polyoxazolidin-2-ones, which are synonymously also named "polyoxazolidones" or "polyoxazolidinones", are polymers having oxazolidinone motives in their structure. They are amorphous linear thermoplastics and can be synthesized by reacting diisocyanates with diepoxides at elevated temperatures in the presence of a catalyst [see, for example, V. Pankratov, T. Frenkel, A. Fainleib, Oxazolidinones, Russ. Chem. Rev. 1983, 52, 576-593 or Hagen Altmann et al., Synthesis of linear poly(oxazolidin-2one)s by cooperative catalysis based on N-heterocyclic carbenes and simple lewis acids, Macromolecules 2019, 52, 2, 487-494]. The synthesis can be done in bulk (solvent free, i.e. reacting (a) and (b) in the presence of (c) is done in the absence of a solvent) or in solution using polar aprotic solvents with high boiling points such as sulfolane or 1,3-dimethyl-2-imidazolidinone (DMI), 4-formyl morpholine, tert-butyl pyrrolidin-2-on, N-butylpyrrolidone. US 2017/088659 A1 discloses a method for the production of oxazolidinone compounds, comprising reacting an epoxide compound and an isocyanate compound in the presence of a catalyst, wherein the catalyst is free of halide anions, and comprises a conjugated trigonal-planar anionic moiety having a central atom which is selected from the elements C or N, and three further substituent atoms, which are selected independently of one another from the elements C, N, O, S and/or P, and wherein the overall charge state of the conjugated trigonal-planar anionic moiety is −1 or −2. EP 3 604370 A1 discloses a catalyst comprising an N heterocyclic carbene and a Lewis acid. WO 2019/052991 A1 compares catalysts such as LiCl with a phosphorous-based catalyst.

The choice of catalyst is essential to obtain linear, high molecular weight polymers, wherein different catalysts are known. The catalyst has to be selective towards the 5-membered oxazolidinone ring and simultaneously has to suppress the epoxy homopolymerization as well as the trimerization of the diisocyanates to isocyanurates. EP 3 456 754 A1 uses alkali salts such as LiCl, LIBr and LiI as catalysts. Further catalysts for reacting diepoxides with diisocyanates are disclosed, for example, in WO 2018/149844 A1, which are ionic liquids. WO 2020/016276 A1 discloses a process for polyoxazolidinon (polyoxazolidon) synthesis with ionic liquids as catalysts, which enables achieving higher molecular weights and reduced polydispersity.

However, one problem associated with the methods of the prior art is that always classical aromatic diisocyanates have to be used. Such aromatic diisocyanates are complicated to handle since they are toxic and some of them are, under normal conditions (1013 mbar, 25° C.), liquid.

SUMMARY OF THE INVENTION

Thus, an object underlying the present invention was to provide components, which could be used instead of classic aromatic diisocyanates in the synthesis of polyoxazolidinones.

The object was solved by using uretdione diisocyanates instead of diisocyanates, that is by a process for preparing a thermoplastic polymer comprising reacting at least components (a) to (b)
  a) a isocyanate composition comprising at least one uretdione diisocyanate (a-i);
  b) an epoxide composition comprising at least one diepoxide (b-i);
  in the presence of a catalyst composition (c).

In comparison to classical aromatic diisocyanates, which are toxic and sometimes liquids, uretdione diisocyanates are solid and in any case less toxic. Due to their solid nature at normal conditions (1013 mbar, 25° C.), they are much easier to handle than liquids. It could be shown that substitution of the liquid diisocyanates by uretdione diisocyanates in the reaction with diepoxides using a suitable catalyst gave the desired thermoplastic polymer in good yields. This successful substitution of the liquid diisocyanates by uretdione diisocyanates drastically improves the safety concept of the polymer synthesis. Moreover, the uretdione diisocyanate, which is used in powder form, is insoluble and non-reacting in the epoxy resin at room temperature (25° C.) even in the presence of a catalyst. Thus, the uretdione diisocyanate can be dispersed in the epoxide composition without reacting. This enables a long shelf-life and a simple one pot synthesis for instance in reactive extrusion. The thermoplastic polymer obtained comprises, preferably to at least 99 weight-% based on the overall weight of the thermoplastic polymer, more preferably is a polyoxazolidin-2-one, which has in the past synonymously also being named "polyoxazolidone" as is herein also abbreviated as "polyoxazolidinone" as mentioned above.

DETAILED DESCRIPTION OF THE INVENTION

Isocyanate Composition (a)

According to the process for preparing a thermoplastic polymer, an isocyanate composition (a) comprising at least one uretdione diisocyanate (a-i) is used. The at least one uretdione diisocyanate (a-i) according to (a) has the formula (I)

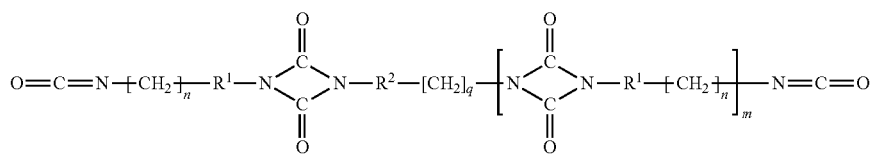

wherein $R^1$ and $R^2$ are each independently selected from:
branched and unbranched C1 to C10-alkylene group;
substituted or unsubstituted C4 to C10-cycloalkyl group, wherein a substituted C4 to C10 cycloalkyl group has one or more substituents independently selected from branched or unbranched C1 to C5-alkyl group;
C1 to C5 alkylene-bridged dicyclohexyl group;
Substituted or unsubstituted C6 to C10-aryl group, wherein a substituted C6 to C10-aryl group has one or more substituents independently selected from branched or unbranched C1 to C5-alkyl group;
C1 to C5-alkylene-bridged di-C6 to C10-aryl group, wherein each C6 to C10-aryl group is unsubstituted or substituted with one or more substituents independently from branched or unbranched C1 to C5-alkyl group; and wherein n and q are independently zero or 1 and m is zero or an integer in the range of from 1 to 10. The index m is preferably zero or an integer in the range of from 1 to 5. "At least one uretdione diisocyanate (a-i)" means that a single uretdione diisocyanate or a mixture of two or more uretdione diisocyanates is used.

In some embodiments, the at least one uretdione diisocyanate (a-i) according to (a) comprises a mixture of two or more compounds of formula (I), which are identical regarding $R^1$, $R^2$, n and q, but which differ in view of the index m. Preferably, in said mixture, ≥20% of the compounds comprised in the mixture have m=zero, more preferred ≥30% of the compounds comprised in the mixture have m=zero, more preferred ≥40% of the compounds comprised in the mixture have m=zero, more preferred ≥50% of the compounds comprised in the mixture have m=zero, more preferred ≥60% of the compounds comprised in the mixture have m=zero, more preferred ≥70% of the compounds comprised in the mixture have m=zero, more preferred ≥80% of the compounds comprised in the mixture have m=zero, more preferred ≥90% of the compounds comprised in the mixture have m=zero, more preferred ≥95% of the compounds comprised in the mixture have m=zero, more preferred ≥96% of the compounds comprised in the mixture have m=zero, more preferred ≥97% of the compounds comprised in the mixture have m=zero, more preferred ≥98% of the compounds comprised in the mixture have m=zero. If the index m is zero, the at least one uretdione diisocyanate (a-i) according to (a) is also called a dimer.

In some embodiments, $R^1$, $R^2$ do not represent a C1 to C5-alkylene-bridged di-C6 to C10-aryl group, i.e. $R^1$ and $R^2$ are each independently selected from:
branched and unbranched C1 to C10-alkylene group;
substituted or unsubstituted C4 to C10-cycloalkyl group, wherein a substituted C4 to C10-cycloalkyl group has one or more substituents independently selected from branched or unbranched C1 to C5-alkyl group;
C1 to C5 alkylene-bridged dicyclohexyl group;
Substituted or unsubstituted C6 to C10-aryl group, wherein a substituted C6 to C10-aryl group has one or more substituents independently selected from branched or unbranched C1 to C5-alkyl group;

n and q are independently zero or 1, the at least one uretdione diisocyanate (a-i) according to (a) thus has preferably the formula (Ia):

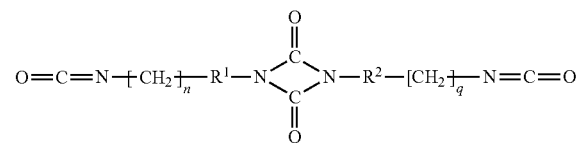

Preferably, the at least one uretdione diisocyanate (a-i) is selected from the group consisting of isophorone diisocyanate uretdione (IPDI-U), toluene diisocyanate uretdion (TDI-U), methylene diisocyanate uretdione (MDI-U) and mixtures of two or more thereof, preferably the uretdione diisocyanate at least comprises TDI-U.

In a preferred embodiment, $R^1$, $R^2$ both represent a toluoyl group and n and q are both zero, the at least one uretdione diisocyanate (a-i) according to (a) thus has the formula (Ia-1)

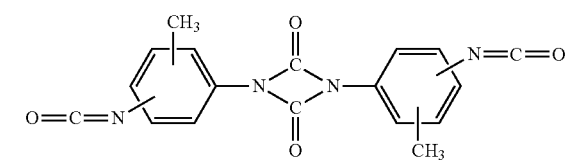

At least one uretdione diisocyanate (a-i) of formula (Ia-1) comprises a single compound and mixtures of two or more compounds having the formula (Ia-1), wherein the —NCO groups and the —CH$_3$ groups are located at different positions of the phenyl ring.

Generally, no restrictions exist regarding the aggregate state of the the uretdione disocyanate (a-i), but preferably, the uretdione disocyanate (a-i) is at least partially, preferably to at least 98 weight-%, solid at 25° C. and at 1013 mbar.

In preferred embodiments of the process, the isocyanate composition (a) does not comprise an uretdione disocyanate (a-i) with an NCO-functionality of more than 2.05, preferably the isocyanate composition (a) does not comprise an uretdione disocyanate (a-i) with an NCO-functionality of less than 1.95 and more than 2.05, determined according to DIN EN ISO 14896. In preferred embodiments of the process, the isocyanate composition a) does not comprise a disocyanate (a-ii) with an NCO-functionality of more than 2.05, preferably the isocyanate composition a) does not comprise a disocyanate (a-ii) with an NCO-functionality of less than 1.95 and of more than 2.05. More preferably, the isocyanate composition (a) does neither comprise an uretdione disocyanate (a-i) with an NCO-functionality of more than 2.05 nor a disocyanate (a-ii) with an NCO-functionality of more than 2.05. More preferably, neither the isocyanate composition (a) nor any other composition or component used in the process for preparing a thereto-plastic polymer comprises an uretdione disocyanate (a-i) with an NCO-functionality of more than 2.05 or a disocyanate (a-ii) with an NCO-functionality of more than 2.05.

The process comprises reacting an isocyanate composition a) comprising at least one uretdione diisocyanate (a-i) with an epoxide composition b) comprising at least one diepoxide (b-i), in the presence of a catalyst composition (c).

Preferably, the process at least two steps (i) and (ii), wherein in a first step
i) an isocyanate composition a) comprising at least one uretdione diisocyanate (a-i) is reacted with an epoxide composition b) comprising at least one diepoxide (b-i), in the presence of a catalyst composition (c), thereby obtaining a reaction mixture; and in a second step
ii) at least one monoisocyanate (ai-iii) with an NCO-functionality of 1 is added to the reaction mixture obtained in the first step i), wherein the at least one monoisocyanate (ai-iii) is preferably added in a amount in the range of from 0.01 to 0.5 mol-% in relation to 100 mol-% of the at least one diepoxide (b-i)

The addition of at least one monoisocyanate (ai-iii) in step (ii) serves the purpose of reacting remaining free epoxide groups of the diepoxide (b-i), which have not reacted with the at least one uretdione diisocyanate (a-i), i.e. an endcapping is done by step (ii). Polymer end-capping is favorable since it helps to avoid undesired/harmful crosslinking and to improve the melt stability.

An NCO-functionality of 1 as indicated for the monoisocyanate (ai-iii) means an NCO-functionality in the range of from 0.95 to 1.05. Also here, the NCO-functionality is determined according to DIN EN ISO 14896.

Preferably, the at least one monoisocyanate (ai-iii) is selected from the group consisting of n-hexylisocyanate, cyclohexyl isocyanate, omega-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhex-yloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoro methyl phenyl isocyanate, benzyl isocyanate, 2,6-dimethylphenylisocyanate, 3,4-dimethylphenylisocyanate, 3,6-dimethylphenylisocyanate, 4-dodecylphenylisocyanat, 4-cyclohexyl-phenyl isocyanate, 4-pentylphenyl isocyanate, 4-tert-butyl phenyl isocyanate and 1-naphthyl isocyanate and mixtures of two or more thereof. "At least one the at least one monoisocyanate (ai-iii)" means that one monoisocyanate (ai-iii) or a mixture of two or more is used.

Preferably, in the process for preparing a thermoplastic polymer, no further poly-, di- or monoisocyanate aside from the at least one uretdione diisocyanate (a-i) and the at least one monoisocyanate (a-iii) are used in the complete process.

Epoxide Composition (b)

An epoxide composition (b) comprising at least one diepoxide (b-i) is used. Preferably, the epoxide composition (b) does not contain an epoxide with a functionality of more than 2.05, preferably the epoxide composition (b) does not contain an epoxide with a functionality of less than 1.95 and more than 2.05. Preferably, at least 98 weight-% of the epoxide composition (b) consists of at least one diepoxide (b-i), relative to the overall weight of the epoxide composition (b). In preferred embodiments, the diepoxide (b-i) comprises at least bisphenol-A-diglycidylether.

The diepoxide (b-i) is a polyepoxide with an average of at least two epoxy groups per molecule, i.e. a diepoxide having a functionality in the range of from 1.95 to 2.05. The diepoxide (b-i) can be both saturated and unsaturated and aliphatic, cycloaliphatic, aromatic or heterocyclic and can also have hydroxyl groups. They can also contain substituents, which do not cause any undesirable side reactions under the reaction conditions, for example alkyl or aryl substituents, ether groups and the like. These diepoxides are preferably polyglycidyl ethers based on polyhydric, preferably dihydric alcohols, phenols, hydrogenation products of these phenols and/or no-volaks (reaction products of mono- or polyhydric phenols with aldehydes, especially formaldehyde in the presence of acidic catalysts). Epoxy resins based on natural raw materials can also be used, e.g. Cardanol A. A typical example of such a product is Cardolite NC 514 (Cardolite). With a longer alkyl chain between the aromatic rings, these epoxy resins allow greater flexibility for the polymers produced therefrom. The following compounds are preferred as polyhydric phenols: resorcinol, hydroquinone, 2,2-bis(4-hydroxyphenyl) propane (bisphenol A), isomer mixtures of dihydroxydiphenylmethane (bisphenol F), tetrabromobisphenol A, 4,4'-dihydroxy-diphenylcyclohexane, 4,4'-dihydroxy-3,3-dimethyldiphenylpropane, 4,4'-dihydroxydiphenyl, 4,4' dihydroxy-benzophenol, bis-(4-hydroxyphenyl)-1,1-ethane, bis-(4-hydroxyphenyl)-1,1-isobutane, bis(4-hydroxyphenyl) methane, bis(4-hydroxyphenyl) ether, bis(4-hydroxyphenyl) sulfone and others as well as the chlorination and bromination products of the aforementioned compounds; bisphenol A is particularly preferred.

Preferably, the diepoxide (b-i) is at least one compound selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S diglycidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidyl ether and diglycidyl isophthalate. More preferred the diepoxide (b-i) is selected from the group consisting of resorcinol diglycidyl ether, bisphenol A diglycidyl ether, and bisphenol F diglycidyl ether. Most preferred the diepoxide compound (B) is selected from the group consisting of bisphenol A diglycidyl ether, and bisphenol F diglycidyl ether. "At least one compound selected from the group consisting of . . . " means that a single diepoxide or a mixture of two or more of the aforementioned diepoxides is used. The epoxy equivalent weights (EEW) of the diepoxide (b-i) is preferably in the range of from 100 to 5000, more preferred in the range of from 150 to 500. The epoxy equivalent weight of a substance is defined as the amount of the substance (in grams) which contains 1 mol of oxirane rings.

Catalyst Composition (c)

The isocyanate composition (a) comprising at least one uretdione diisocyanate (a-i) and the epoxide composition (b) comprising at least one diepoxide (b-i) are reacted in the presence of a catalyst composition (c).

Preferably, the catalyst composition (c) comprises at least one ionic liquid (c-i), wherein suitable ionic liquids are disclosed in WO 2020/016276 A1 in the section "Katalysator" (see page 5, line 21 to page 23, line 6), which is herein incorporated by reference.

In preferred embodiments, the catalyst composition (c) comprises one or more ionic liquids (c-i), which are salts of the following formula (I)

$$[A]_n^+[Y]^{n-} \quad (I),$$

wherein n is an integer in the range of from 1 to 4;

[A]+ is a quaternary ammonium cation, which comprises a five or six membered heterocycle, which comprises at least one nitrogen atom and optionally an oxygen atom or a sulfur atom, wherein the nitrogen atom of the hetero cycle is quaternised with t $C_1$-$C_{18}$ alkyl residues; and

[Y]$^{n-}$ is a mono-, di-, tri-, or tetra-valent anion.

In some embodiments, [Y]$^{n-}$ is selected from the group of carboxylates $R^3COO^-$, wherein $R^3$ is a C1 to C30 alkyl group and halogen anion, preferably bromide or chloride.

In preferred embodiments, the at least one ionic liquid (c-i) is selected from the group of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (ED-MIM-Br), 1-(2-hydroxyethyl)-3-methyl imidazolium chloride (HEMIM-Cl), butyl-1-methylpiperidinium acetate (BMPM acetate), and mixtures of two or more thereof, preferably the catalyst composition (c) comprises at least BMPM-Cl as ionic liquid (c-i).

In preferred embodiments, the isocyanate composition (a) comprises comprises at least TDI-U as uretdion diisocyanate (a-i); and the catalyst composition (c) comprises at least BMPM-Cl as ionic liquid (c-i). In further preferred embodiments, isocyanate composition (a) comprises comprises at least TDI-U as uretdion diisocyanate (a-i); the catalyst composition (c) comprises at least BMPM-Cl as ionic liquid (c-i); and the epoxide composition (b) comprises at least bisphenol A diglycidyl ether as diepoxide (b-i).

Reaction Conditions

In the process, the isocyanate composition (a) comprising at least one uretdione diisocyanate (a-i) is reacted with the epoxide composition (b) comprising at least one diepoxide (b-i) in the presence of a catalyst composition (c).

Preferably, reacting (a) and (b) in the presence of (c) is done at a temperature in the range of from 100 to 300° C., preferably in the range of from 120 to 280° C., more preferably in the range of from 140 to 260° C., more preferably in the range of from 150 to 230° C., more preferably in the range of from 150 to 220° C., more preferably in the range of from 155 to 220° C. Preferably, reacting (a) and (b) in the presence of (c) is done at a pressure in the range of from 900 to 1500 mbar, preferably in the range of from 950 to 1200 mbar, more preferred in the range of from 1000 to 1100 mbar.

Generally, no restrictions exist regarding the molar ratios which are used for the at least one diepoxide (b-i) and the at least one uretdione diisocyanate (a-i) as long as the reaction product is a thermoplastic polymer, preferably a polyoxazolidinone. Preferably, the process is carried out in that the molar ratio of the at least one diepoxide (b-i) to the at least one uretdione diisocyanate (a-i) is in the range of from 1.0:0,5 to 0.5:1.0, more preferably in the range of from 1:0.2 to 1:0.8, more preferably in the range of from 1:0.4 to 1:0.6.

Generally, no restrictions exist regarding the molar ratios which are used for the at least one diepoxide (b-i) and the at least one uretdione diisocyanate (a-i) as long as the reaction product is a thermoplastic polymer, preferably a polyoxazolidinone.

Generally, no restrictions exist regarding the molar ratios which are used for the molar ratio of the at least one uretdione diisocyanate (a-i) added in the first step (i) and the at least one monoisocyanate (ai-iii) added in the second step (ii) as long as the reaction product is a thermoplastic polymer, preferably a polyoxazolidinone. Preferably, the molar ratio of the at least one uretdione diisocyanate (a-i) added in the first step (i) to the at least one monoisocyanate (ai-iii) added in the second step (ii) is in the range of from 99.9:0.02 to 99.8:0.04.

Generally, no restrictions exist regarding the amount of catalyst composition (c) used, as long as the reaction product is a thermoplastic polymer, preferably a polyoxazolidinone. Preferably, the concentration at which the catalyst composition (c), more preferably the at least one ionic liquid (c-i) is used is in the range of from 0.05 Mol-% to 5 Mol-% relative to the epoxide groups of the diepoxide (b-i).

In preferred embodiments, (b) and (c) are initially mixed to obtain a pre-mixture (b+c), and (a) is added, preferably stepwise, to the pre-mixture (b+c). "Stepwise" means that the overall amount of the isocyanate composition (a) is added over a time period in at least two portions, wherein each portion comprises in the range of from 10 to 90 weight-% of the overall amount of (a). Preferably, the time period is at least 30 minutes, more preferred at least 1 hour, wherein the at least two portions are added so that a first portion is added at the time period and a second portion is added after half the time period. It goes without saying that in case of more than two portions, the further ($3^{rd}$, $4^{th}$ . . . ) are added in an about equal timely distance. For example, if the overall amount of (a) is split into six portions, and the time period is, for example, 2 hours, the first portion is added at the beginning, the $2^{nd}$ portion is added is added after 20 minutes, the $3^{rd}$ portion is added after 40 minutes, etc.

In principle, reacting (a) and (b) in the presence of (c) can be done in any suitable atmosphere, as long as the final product is a thermoplastic polymer, preferably a polyoxazolidinone. In preferred embodiments, reacting (a) and (b) in the presence of (c) is done in a protective atmosphere, more preferably an inert gas atmosphere, wherein the inert gas is preferably selected from the group consisting of helium, neon, argon, krypton, radon, xenon, nitrogen and mixtures of two or more of these inert gases.

In further preferred embodiments, reacting (a) and (b) in the presence of (c) is done in an atmosphere comprising oxygen, preferably in an atmosphere comprising more than 5 volume-%, preferably more than 10 volume-%, more preferred more than 15 volume-%, more preferred more than 20 volume-%, of oxygen, based on the total composition of the atmosphere. More preferred, reacting (a) and (b) in the presence of (c) is done in ambient atmosphere, i.e. under air.

In preferred embodiments, reacting (a) and (b) in the presence of (c) is done at a pressure in the range of from 1000 to 1100 mbar and in an atmosphere comprising more than 20 volume %, of oxygen, based on the total composition of the atmosphere, more preferred under air. In further preferred embodiments, reacting (a) and (b) in the presence of (c) is done at a pressure in the range of from 1000 to 1100 mbar; in an atmosphere comprising more than 20 volume-%, of oxygen, based on the total composition of the atmosphere, more preferred under air; and at a temperature in the range of from 155 to 220° C.

Preferably, reacting (a) and (b) in the presence of (c) is done in a solvent, wherein the solvent is preferably one or more polar aprotic solvent, more preferably selected from the group consisting of 1,3-dimethyl-2-imidazolidinon (DMI); dichlorobenzene, preferably 1,2, dichlorobenzene, 1, 2, 3-trichlorobenzene; 1,2,4-trichlorobenzene, 1,3,5-trichlorobenzene, sulfolane, mesitylene, N-methyl pyrolidone, 4-formyl morpholine, tert-butyl pyrrolidin-2-on, N-butyl pyrrolidone, and mixtures of two or more of these solvents, preferably, the solvent comprises at least sulfolane (tetrahydrothiophen-1,1-dioxide). The use of a solvent may be advantageous since selectivity is bet-ter than in a bulk synthesis. It can be speculated, that the solvent, due to a dilution of the educts, helps to avoid undesired trimerization.

In alternative embodiments, the process is preferably a bulk process, wherein no solvent is used: (a) and (b) are reacted in the presence of (c) without any solvent. Compared to the solvent based process, the bulk synthesis without solvent is favorable since higher monomer conentrations can be used. The selectivity towards formation of oxazolidinone moieties can be increased by using a stepwise process, wherein (a) is stepwise added to the pre-mixture (b+c). Using an extruder for the synthesis further helps to suppress the side products/impurities. Additionally, a stable (non-reacting) suspension of diepoxide (b-i), uretdione diisocyanate (a-i), and catalyst (c-i) is feasible when a bulk synthesis is used.

$2^{nd}$ Aspect—Product-by-Process

In a second aspect, the invention relates to a thermoplastic polymer obtained or obtainable from the process according to the above-described first aspect of the invention.

Thus, the invention also relates to a thermoplastic polymer obtained or obtainable from the reaction of at least
  a) a isocyanate composition comprising at least one uretdione diisocyanate (a-i);
  b) an epoxide composition comprising at least one diepoxide (b-i);
  in the presence of a catalyst composition (c).

$3^{rd}$ Aspect—Use

In a third aspect, the invention relates to a thermoplastic polymer obtained or obtainable from the process according to the first aspect of the invention as described above or the thermoplastic polymer according to the second aspect of the invention, for the preparation of a fibre or a molded article, preferably made by injection molding, calendering, powder sintering, laser sintering, melt pressing or extrusion, or as a modifier for another thermoplastic material.

The present invention is further illustrated by the following set of embodiments and combinations of embodiments resulting from the dependencies and back-references as indicated. In particular, it is noted that in each instance where a range of embodiments is mentioned, for example in the context of a term such as "any one of embodiments (1) to (4)", every embodiment in this range is meant to be explicitly disclosed for the skilled person, i.e. the wording of this term is to be understood by the skilled person as being synonymous to "any one of embodiments (1), (2), (3), and (4)". Further, it is explicitly noted that the following set of embodiments does not determine the extent of protection, but represents a suitably structured part of the description directed to general and preferred aspects of the present invention.

According to an embodiment (1), the invention relates to a process for preparing a thermoplastic polymer comprising reacting at least components (a) to (b)
  a) an isocyanate composition comprising at least one uretdione diisocyanate (a-i);
  b) an epoxide composition comprising at least one diepoxide (b-i);
  in the presence of a catalyst composition (c).

A preferred embodiment (2) concretizing embodiment (1) relates to said process, wherein the uretdione diisocyanate (a-i) according to (a) has the formula (I)

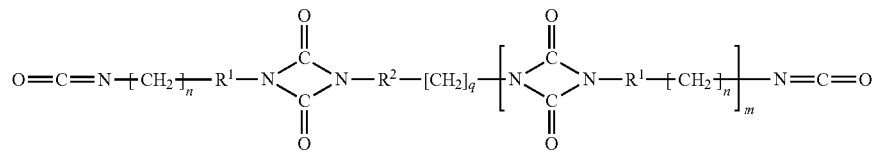

wherein $R^1$ and $R^2$ are each independently selected from:
branched and unbranched C1 to C10-alkylene group;
substituted or unsubstituted C4 to C10-cycloalkyl group, wherein a substituted C4 to C10-cycloalkyl group has one or more substituents independently selected from branched or unbranched C1 to C5-alkyl group;
C1 to C5 alkylene-bridged dicyclohexyl group;
Substituted or unsubstituted C6 to C10-aryl group, wherein a substituted C6 to C10-aryl group has one or more substituents independently selected from branched or unbranched C1 to C5-alkyl group;
C1 to C5-alkylene-bridged di-C6 to C10-aryl group, wherein each C6 to C10-aryl group is unsubstituted or substituted with one or more substituents independently from branched or unbranched C1 to C5-alkyl group; and
wherein n and q are independently zero or 1 and m is zero or an integer in the range of from 1 to 10.

A further preferred embodiment (3) concretizing embodiment (1) or (2) relates to said process, wherein the at least one uretdione diisocyanate (a-i) is selected from the group consisting of isophorone diisocyanate uretdione (IPDI-U), toluene diisocyanate uretdion (TDI-U), methylene diisocyanate uretdione (MDI-U) and mixtures of two or more thereof, preferably the uretdione diisocyanate at least comprises TDI-U.

A further preferred embodiment (4) concretizing any one of embodiments (1) to (3) relates to said process, wherein the uretdione disocyanate (a-i) is at least partially, preferably to at least 98 weight-%, solid at 25° C. and at 1013 mbar.

A further preferred embodiment (5) concretizing any one of embodiments (1) to (4) relates to said process, wherein the isocyanate composition (a) does not comprise an uretdione disocyanate (a-i) with an NCO-functionality of more than 2.05, preferably the isocyanate composition (a) does not comprise an uretdione disocyanate (a-i) with an NCO-functionality of less than 1.95 and more than 2.05, determined according to DIN EN ISO 14896.

A further preferred embodiment (6) concretizing any one of embodiments (1) to (5) relates to said process, wherein the isocyanate composition a) does not comprise a disocyanate (a-ii) with an NCO-functionality of more than 2.05, preferably the isocyanate composition a) does not comprise a disocyanate (a-ii) with an NCO-functionality of less than 1.95 and more than 2.05.

A further preferred embodiment (7) concretizing any one of embodiments (1) to (6) relates to said process, wherein
in a first step
i) isocyanate composition a) comprising at least one uretdione diisocyanate (a-i) is reacted with epoxide composition b) comprising at least one diepoxide (b-i), in the presence of a catalyst composition (c), thereby obtaining a reaction mixture;
and in a second step
ii) at least one monoisocyanate (ai-iii) with an NCO-functionality of 1 is added to the reaction mixture obtained in the first step i), wherein the at least one monoisocyanate (ai-iii) is preferably added in a amount in the range of from 0.01 to 0.5 mol-% in relation to 100 mol-% of the at least one diepoxide (b-i)

A further preferred embodiment (8) concretizing any one of embodiments (1) to (7) relates to said process, wherein the monoisocyanate (a-iii) is selected from the group consisting of n-hexylisocyanate, cyclohexyl isocyanate, omega-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhex-yloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoro methyl phenyl isocyanate, benzyl isocyanate, 2,6-dimethylphenylisocyanate, 3,4-dimethylphenylisocyanate, 3,6-dimethylphenylisocyanate, 4-dodecylphenylisocyanat, 4-cyclohexyl-phenyl isocyanate, 4-pentylphenyl isocyanate, 4-tert-butyl phenyl isocyanate and 1-naphthyl isocyanate and mixtures of two or more thereof.

A further preferred embodiment (9) concretizing any one of embodiments (1) to (8) relates to said process, wherein the epoxide composition (b) does not contain an epoxide with a functionality of more than 2.05, preferably the epoxide composition (b) does not contain an epoxide with a functionality of less than 1.95 and more than 2.05.

A further preferred embodiment (10) concretizing any one of embodiments (1) to (9) relates to said process, wherein at least 98 weight-% of the epoxide composition (b) consists of at least one diepoxide (b-i), relative to the overall weight of the epoxide composition (b).

A further preferred embodiment (11) concretizing any one of embodiments (1) to (10) relates to said process, wherein the diepoxide (b-i) comprises at least bisphenol-A-diglycidylether.

A further preferred embodiment (12) concretizing any one of embodiments (1) to (11) relates to said process, wherein the catalyst composition (c) comprises at least one ionic liquid (c-i), preferably selected from the group of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (EDMIM-Br), 1-(2-hydroxyethyl)-3-methyl imidazolium chloride (HEMIM-Cl), butyl-1-methylpiperidinium acetate (BMPM acetate), and mixtures of two or more thereof, preferably the catalyst composition (c) comprises at least BMPM-Cl.

A further preferred embodiment (13) concretizing any one of embodiments (1) to (12) relates to said process, wherein reacting (a) and (b) in the presence of (c) is done at a temperature in the range of from 100 to 300° C., preferably in the range of from 120 to 280° C., more preferably in the range of from 140 to 260° C., more preferably in the range of from 150 to 230° C., more preferably in the range of from 150 to 220° C., more preferably in the range of from 155 to 220° C.

A further preferred embodiment (14) concretizing any one of embodiments (1) to (13) relates to said process, wherein reacting (a) and (b) in the presence of (c) is done at a pressure in the range of from 900 to 1500 mbar, preferably in the range of from 950 to 1200 mbar, more preferred in the range of from 1000 to 1100 mbar.

A further preferred embodiment (15) concretizing any one of embodiments (1) to (14) relates to said process, where the molar ratio of the at least one diepoxide (b-i) to the at least one uretdione diisocyanate (a-i) is in the range of from 1.0:0,5 to 0.5:1.0, preferably in the range of from 1:0.2 to 1:0.8, more preferably in the range of from 1:0.4 to 1:0.6.

A further preferred embodiment (16) concretizing any one of embodiments (1) to (15) relates to said process, wherein the molar ratio of the at least one uretdione diisocyanate (a-i)

added in the first step i) to the at least one monoisocyanate (ai-iii) added in the second step ii) is in the range of from 99.9:0.02 to 99.8:0.04.

A further preferred embodiment (17) concretizing any one of embodiments (1) to (16) relates to said process, wherein the catalyst concentration is in the range of from 0.05 Mol-% to 5 Mol-% relative to the epoxide groups of the diepoxide (b-i).

A further preferred embodiment (18) concretizing any one of embodiments (1) to (1) relates to said process, wherein (b) and (c) are initially mixed to obtain a pre-mixture (b+c), and wherein (a) is added, preferably stepwise, to the pre-mixture (b+c).

A further preferred embodiment (19) concretizing any one of embodiments (1) to (1) relates to said process, wherein reacting (a) and (b) in the presence of (c) is done in a protective atmosphere, preferably an inert gas atmosphere, wherein the inert gas is preferably selected from the group consisting of helium, neon, argon, krypton, radon, xenon, nitrogen and mixtures of two or more of these inert gases.

A further preferred embodiment (20) concretizing any one of embodiments (1) to (19) relates to said process, which is a bulk process (solvents absent).

A further preferred embodiment (21) concretizing any one of embodiments (1) to (19) relates to said process, wherein reacting (a) and (b) in the presence of (c) is done in a solvent, wherein the solvent is preferably one or more polar aprotic solvent, more preferably selected from the group consisting of 1,3-dimethyl-2-imidazolidinon (DMI); dichlorobenzene, preferably 1,2, dichlorobenzene, 1, 2, 3-trichlorobenzene; 1,2,4-trichlorobenzene, 1,3,5-trichlorobenzene, sulfolane, mesitylene, N-methyl pyrolidone, 4-formyl morpholine, tert-butyl pyrrolidin-2-on, N-butyl pyrrolidone, and mixtures of two or more of these solvents, preferably, the solvent comprises at least sulfolane (tetrahydrothiophen-1,1-dioxide).

According to an embodiment (22), the present invention relates to a thermoplastic polymer obtained or obtainable from the process according to any one of embodiments (1) to (21).

A preferred embodiment (23) concretizing embodiment (22) relates to said thermoplastic polymer, which is obtained or obtainable from the reaction of at least
a) a isocyanate composition comprising at least one uretdione diisocyanate (a-i);
b) an epoxide composition comprising at least one diepoxide (b-i);
in the presence of a catalyst composition (c).

According to an embodiment (24), the present invention relates to the use of a thermoplastic polymer obtained or obtainable from the process according to any one of embodiments (1) to (21) or the thermoplastic polymer of embodiment (22) or (23) for the preparation of a fibre or a molded article, preferably made by injection molding, calendering, powder sintering, laser sintering, melt pressing or extrusion, or as a modifier for another thermoplastic material.

As already mentioned above, it is explicitly noted that the preceding set of embodiments does not determine the extent of protection, but represents a suitably structured part of the description directed to general and preferred aspects of the present invention.

The present invention is further illustrated by the following reference examples, comparative examples, and examples.

EXAMPLES

Methods

DSC: DSC diagrams were obtained according to ASTM D 3418, measurements were done with a Netzsch 204 F1 Phoenix apparatus NCO: NCO content was determined by titration according to DIN EN ISO 14896

Reference Example 1: Synthesis of TDI Uretdione

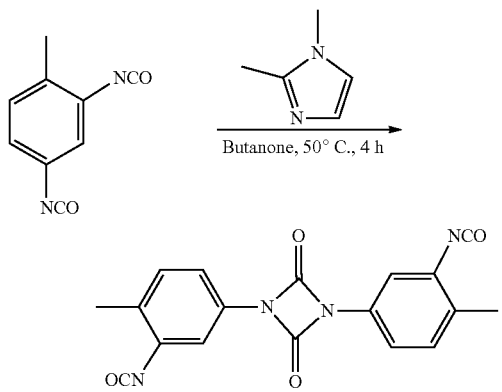

2,4-Toluene diisocyanate (T100, 100% 2,4-TDI) (50.25 g; 288 mmol; 1 eq) in butanone (80.60 g) was heated in a 4-neck 250 ml reactor to 50° C. at about normal pressure (1013 mbar). 1,2-dimethylimidazole (1,2 DMI) (294 mg; 3 mmol; 0.006 eq) was dissolved in 1.92 g butanone and added dropwise to the solution. The transparent mixture turned yellow and was stirred for 4 h at 50° C., wherein a white solid appeared. After 4 h, the reaction was cooled down to room temperature (here 24.1° C.) and stirred overnight. The white mixture was filtered (pore diameter 25 μm) and washed with butanone (90 ml). The resulting white powder was dried under vacuo (6 h). 38.02 g of a white solid was obtained. The yield regarding TDI urethdione (TDI-U) was 75%, based on the amount of toluene diisocyanate used.

$^1$H NMR (500 MHz, Chloroform-d) δ 7.28 (dd, J=8.2, 2.0 Hz, 2H), 7.24 (d, J=1.9 Hz, 2H), 7.20 (d, J=8.2 Hz, 2H), 2.31 (s, 6H).

NCO %: Theory: 24.12%; Measurement: 24.39%

The DSC diagram (DSC: differential scanning calorimetry), measured with a Netzsch 204 F1 Phoenix apparatus, is shown in FIG. 1.

Reference Example 2: Synthesis of TDI Uretdiones Using T80

In Reference Example 1, T100 (100% 2,4-TDI) was used to make TDI uretdiones. However, products are available on the market containing mixtures of TDI isomers. For example, "T80" is an isomeric mixture of 80 weight-% 2,4-TDI and 20 weight-% 2,6-TDI. The chemical structures of the two isomers are shown below:

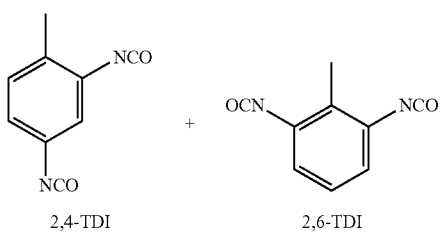

2,4-TDI     2,6-TDI

To investigate the effect of the isomeric mixture, uretdiones were synthesized according to Reference Example 1 using T80 instead of T100. The resulting uretdione was analyzed using DSC—the DSC diagram is shown in FIG. 2.

From the DSC curves, it was apparent that the first sweep (dark grey) shows the usual TDI uretdione ring-opening temperature of around 160° C. The temperature ramp was set from room temperature to 180° C. and was followed by a cooling ramp to −30° C. That way, TDI was released first from the uretdione and subsequently captured by freezing. The second heating sweep (light grey) revealed two endothermic peaks at 14° C. and 21° C. These temperatures correlated to the melting temperatures of 2,6-TDI and 2,4-TDI, respectively, proving that the uretdione ring has not only been formed between the para-NCO groups of 2,4-TDI but also between the less reactive ortho-NCO groups in both, 2,4-TDI and 2,6-TDI. It was therefore evident that TDI uretdiones could be formed from T80 without losing 20% of TDI.

Reference Example 3: Synthesis of MDI Uretdione

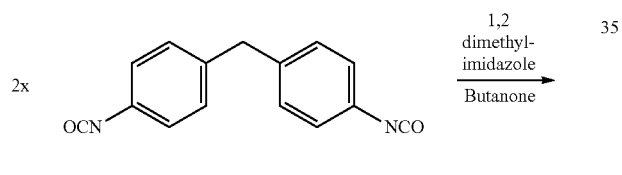

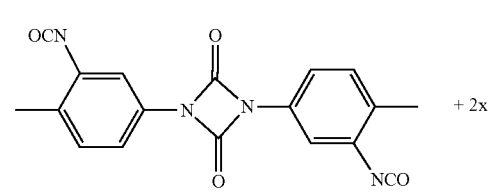

-continued

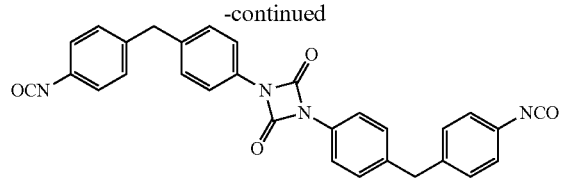

Under nitrogen (N₂, gaseous), 4,4' Methylendi(phenylisocyanat)e (4,4'-MDI; 20.00 g; 79.90 mmol; 1 eq) and butanone (26.87 g) were heated to 50° C. at about normal pressure (1013 mbar). 1,2 dimethylimidazole (109.25 mg; 1.17 mmol; 0.014 eq) was added dropwise to the solution. The transparent mixture turned yellow and was stirred for 4 h at 50° C. A white solid appeared. After 4 h, heating was stopped, and the crude product was stirred at room temperature (23.5° C.) overnight. After filtration, a white powder was obtained (diamenter of the pores of the filter: 10-16 μm), washed with butanone (50 ml) and dried under vacuum. The final product MDI urethdione was obtained as a white powder (17.55 g). The yield regarding MDI urethdione (MDI-U) was 87.5%, based on the amount of 4,4'-MDI used.

$^1$H NMR (400 MHz, Methylene Chloride-d2) δ 7.44 (d, J=8.5 Hz, 4H), 7.21 (d, J=8.5 Hz, 4H), 7.13 (d, J=6.5 Hz, 4H), 7.03 (d, J=8.4 Hz, 4H), 3.93 (s, 4H).

Example 1: Synthesis of Polyoxazolidinone Using TDI Uretdione in Solution

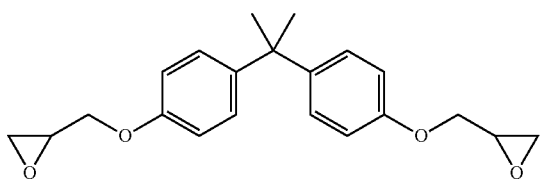

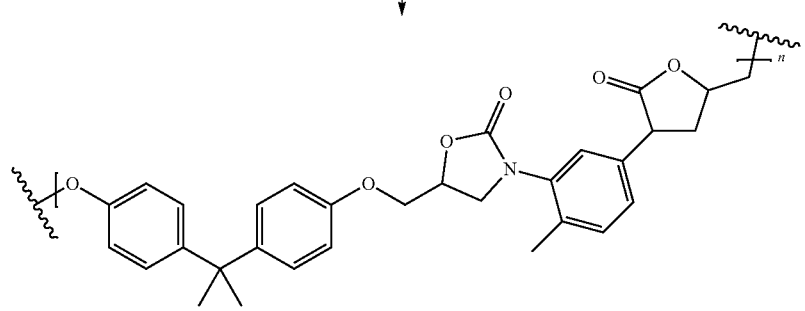

Bisphenol A diglycidylether (DER 332; 12.24 g, 70.80 mmol; 2.01 eq) with 1-butyl-1methylpiperi-dinium chlorid (BMPM-Cl; 67.42 mg; 0.35 mmol; 0.01 eq; 0.49 mol % to DER 332) in sulfolane (42.32 g) were heated to 175° C. Next, TDI-U from Reference Example 1 (12.24 g; 35.15 mmol; 1.00 eq) was added stepwise with a spatula for 2 h and its consumption was followed by IR (consumption of the isocyanate with the disappearing of the band at 2270 $cm^{-1}$ and appearance of the carbonyl band of oxazolidinone at 1750 $cm^{-1}$). The reaction was stirred for 1 h at 175° C. after the TDI-U has reacted. Then, the crude solution was cooled down to 90° C. (the crude solution became more viscous) and was added dropwise to a water/ethanol (20/80) solution under stirring with an Ultra-Turrax® (2000 to 5000 rpm). The suspension was filtrated (pore diameter 10-15 μm) and dried under vacuum (drying agent: silica gel rubin). A white powder was obtained. Several cycles of purification by stirring were done if necessary. The final polyoxazolidinone was obtained as a very fine white powder (30.00 g). The yield regarding polyoxazolidinone was 82% based on the amount of TDI-U used.

$^1$H NMR (400 MHz, DMSO-d6) δ 7.62 (s, 1H), 7.45 (s, 1H), 7.31 (s, 1H), 7.10 (s, 4H), 6.86 (d, J=14.1 Hz, 4H), 5.04 (s, 2H), 4.31-4.06 (m, 6H), 3.90 (s, 1H), 3.79 (s, 1H), 2.22 (s, 3H), 1.55 (s, 6H)

Example 2: Synthesis of Polyoxazolidinone in Solution Using Napththylisocyanate as Endcapping Agent A mixture of DER 332 (6.04 g; 17.74 mmol; 2.25 eq) and BMPM-Cl (16.95 mg; 0.09 mmol; 0.01 eq) in sulfolane (27.78 g) was heated to 175° C. at about normal pressure (1013 mbar). Then, TDI-U (2.75 g; 7.89 mmol; 1 eq) was added stepwise with a spatula and the isocyanate consumption was followed by IR. After the complete consumption of TDI-U, 1-naphtylisocyanate (147 mg; 0.87 mmol; 0.11 eq) was added dropwise to the reaction mixture and the isocyanate consumption was followed by IR as in Example 1. Next, the crude solution was cooled to 100° C. and added dropwise to a 80/20 ethanol/water solution under stirring with an Ultra-Turrax® (2000 to 5000 rpm). The precipitate was filtered and dried under vacuo. Several cycles of purification were done if necessary. The final polyoxazolidinone was obtained as a white powder (6.74 g). The yield regarding polyoxazolidinone was 75% based on the amount of TDI-U used.

Example 3: Synthesis of Polyoxazolidinone Using TDI Uretdione in Bulk

All bulk synthesis were done in a DSM mini extruder with a melt volume of around 20 ml.

Extruder 1:

A mixture of BMPM-Cl (38.2 mg; 0.2 mmol; 0.01 eq) and DER 332 (13.55 g; 39.8 mmol; 2.17 eq) was put in the extruder, the mixture was heated to 160° C. and TDI-U (6.39 g; 18.3 mmol; 1.00 eq) was added stepwise to the mixture. After the addition, the temperature was set to 190° C., then 200° C., then 210° C. The heating from one temperature to the next took about less than 5 minutes; each temperature was kept for a time period in the range of from 60 to 90 minutes. A brown transparent polymer strand was obtained.

1H NMR (400 MHz, DMSO-d6) δ 7.62 (s, 1H), 7.47 (s, 1H), 7.32 (s, 1H), 7.11 (dd, J=6.5, 2.2 Hz, 4H), 6.93-6.80 (m, 4H), 5.04 (s, 2H), 4.37-4.01 (m, 6H), 3.91 (s, 1H), 3.80 (dd, J=11.3, 6.5 Hz, 1H), 2.23 (s, 3H), 1.58 (s, 6H).

Extruder 2:

A mixture of BMPM-Cl (54.37 mg; 0.28 mmol; 0.01 eq), DER 332 (19.31 g; 56.7 mmol; 2.00 eq), and TDI-U (9.87 g; 28.3 mmol; 1.00 eq) was put in the extruder at 100° C., the mixture was heated to 160° C. The mixture was then heated to 200° C., 220° C. and 250° C. The heating from one temperature to the next took about less than 5 minutes; each temperature was kept for a time period in the range of from 60 to 90 minutes. A brown polymer strand was obtained.

Extruder 4:

A mixture of BMPM-Cl (35.5 mg; 0.18 mmol; 0.01 eq) and DER 332 (12.41 g; 36.01 mmol; 2.00 eq) was put in the extruder at 175° C. TDI-U (6.01 g; 17.25 mmol; 1.00 eq) was added steppwise to the mixture. The mixture was then heated to 190° C. and 210° C. A brown polymer strand was obtained.

CITED LITERATURE

Figure 1:
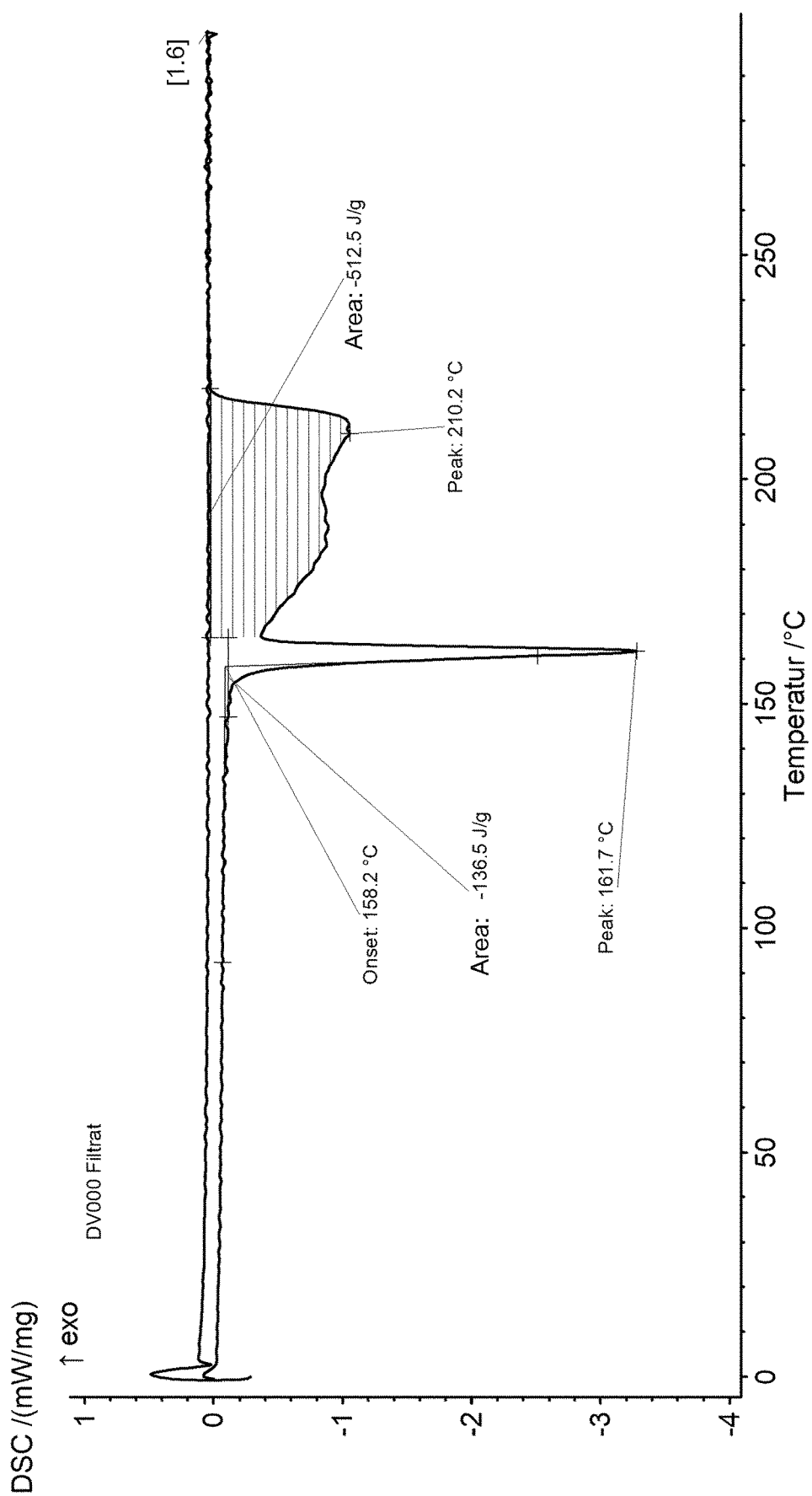
FIG. 1: shows the DSC diagram from the TDI urethdione obtained from T100 (Reference Example 1).
Figure 2:
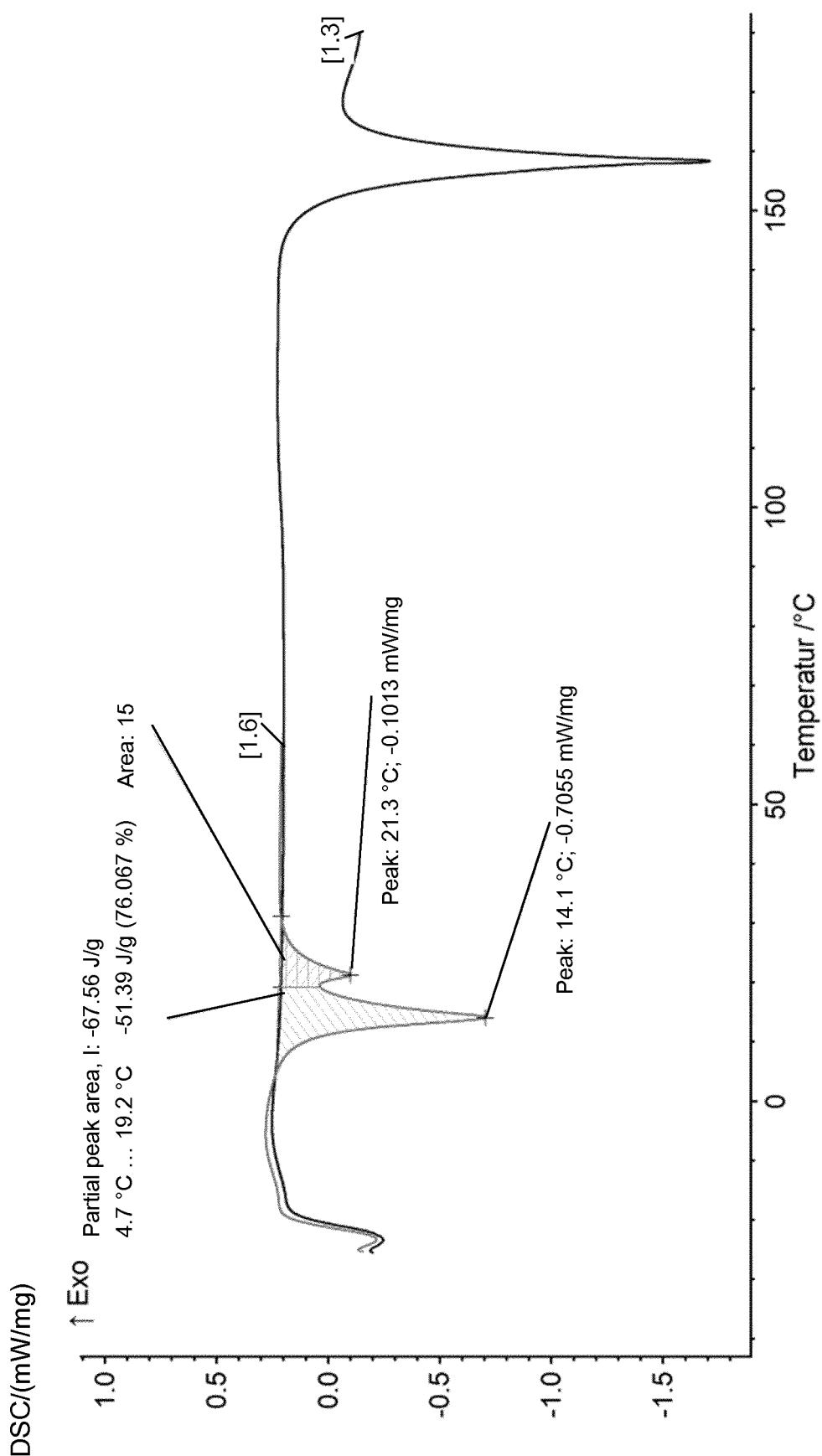
FIG. 2: shows the DSC curves of TDI uretdione made from T80 (Reference Example 2). It can be seen that by passing the ring opening temperature of the uretdione (160° C., dark grey curve), TDI was released and the melting peaks of 2,4-TDI and 2,6-TDI were captured (light grey curve) proving that the uretdione consisted of both, 2,4-TDI and 2,6-TDI.

V. Pankratov, T. Frenkel, A. Fainleib, Oxazolidinones, *Russ. Chem. Rev.* 1983, 52, 576-593

Hagen Altmann et al., Synthesis of linear poly(oxazolidin-2one)s by cooperative catalysis based on N-heterocyclic carbenes and simple lewis acids, *Macromolecules* 2019, 52, 2, 487-494

EP 3 456 754 A1

WO 2018/149844 A1

WO 2020/016276 A1

US 2017/088659 A1

EP 3 604370A1

WO 2019/052991 A1

The invention claimed is:

1. A process for preparing a thermoplastic polymer, comprising:

reacting at least components (a) to (b):

(a) an isocyanate composition comprising at least one uretdione diisocyanate (a-i);

(b) an epoxide composition comprising at least one diepoxide (b-i);

in the presence of a catalyst composition (c), wherein the catalyst composition (c) comprises at least one ionic liquid (c-i) selected from the group consisting of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (EDMIM-Br), 1-(2-hydroxyethyl)-3-methyl imidazolium chloride (HEMIM-Cl), butyl-1-methylpiperidinium acetate (BMPM acetate), and a mixture of two or more thereof.

2. The process of claim 1, wherein the at least one uretdione diisocyanate (a-i) has the formula (I)

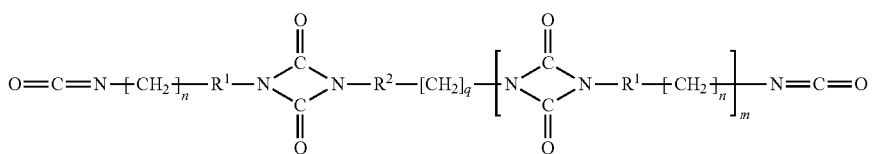

wherein R$^1$ and R$^2$ are each independently selected from the group consisting of:
  branched and unbranched C1 to C10-alkylene group;
  substituted or unsubstituted C4 to C10-cycloalkyl group, wherein a substituted C4 to C10-cycloalkyl group has one or more substituents independently selected from branched or unbranched C1 to C5-alkyl group;
  C1 to C5 alkylene-bridged dicyclohexyl group;
  substituted or unsubstituted C6 to C10-aryl group, wherein a substituted C6 to C10-aryl group has one or more substituents independently selected from branched or unbranched C1 to C5-alkyl group; and
  C1 to C5-alkylene-bridged di-C6 to C10-aryl group, wherein each C6 to C10-aryl group is unsubstituted or substituted with one or more substituents independently selected from branched or unbranched C1 to C5-alkyl group; and
wherein n and q are independently zero or 1, and m is zero or an integer in a range of from 1 to 10.

3. The process of claim 2, wherein the at least one uretdione diisocyanate (a-i) is selected from the group consisting of isophorone diisocyanate uretdione (IPDI-U), toluene diisocyanate uretdione (TDI-U), methylene diisocyanate uretdione (MDI-U), and a mixture of two or more thereof.

4. The process of claim 3, wherein the at least one uretdione diisocyanate (a-i) comprises toluene diisocyanate uretdione (TDI-U).

5. The process of claim 1, wherein
  i) the isocyanate composition (a) comprising at least one uretdione diisocyanate (a-i) is reacted with the epoxide composition (b) comprising at least one diepoxide (b-i), in the presence of the catalyst composition (c), thereby obtaining a reaction mixture; and
  ii) at least one monoisocyanate (ai-iii) with an NCO-functionality of 1 is added to the reaction mixture obtained in i).

6. The process of claim 5, wherein the at least one monoisocyanate (ai-iii) is added in an amount in a range of from 0.01 to 0.5 mol-%, in relation to 100 mol-% of the at least one diepoxide (b-i).

7. The process of claim 5, wherein the at least one monoisocyanate (ai-iii) is selected from the group consisting of n-hexylisocyanate, cyclohexyl isocyanate, omega-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate, dichlorophenyl isocyanate, 4-nitrophenyl isocyanate, 3-trifluoro methyl phenyl isocyanate, benzyl isocyanate, 2,6-dimethylphenylisocyanate, 3,4-dimethylphenylisocyanate, 3,6-dimethylphenylisocyanate, 4-dodecylphenylisocyanat, 4-cyclohexyl-phenyl isocyanate, 4-pentylphenyl isocyanate, 4-tert-butyl phenyl isocyanate, 1-naphthyl isocyanate, and a mixture of two or more thereof.

8. The process of claim 1, wherein at least 98 weight-% of the epoxide composition (b) consists of the at least one diepoxide (b-i), relative to an overall weight of the epoxide composition (b).

9. The process of claim 5, wherein the at least one diepoxide (b-i) comprises bisphenol-A-diglycidylether.

10. The process of claim 1, wherein the catalyst composition (c) comprises at least 1-butyl-1-methylpiperidinium chloride (BMPM-Cl).

11. The process of claim 1, wherein reacting the isocyanate composition (a) and the epoxide composition (b) in the presence of the catalyst composition (c) is done at a temperature in a range of from 100 to 300° C.; and/or
  wherein reacting the isocyanate composition (a) and the epoxide composition (b) in the presence of the catalyst composition (c) is done at a pressure in a range of from 900 to 1500 mbar.

12. The process of claim 4, wherein a molar ratio of the at least one diepoxide (b-i) to the at least one uretdione diisocyanate (a-i) is in a range of from 1.0:0.5 to 0.5:1.0; and/or
  wherein a molar ratio of the at least one uretdione diisocyanate (a-i) added in i) to the at least one monoisocyanate (ai-iii) added in ii) is in a range of from 99.9:0.02 to 99.8:0.04.

13. The process of claim 1, wherein a catalyst concentration is in a range of from 0.05 Mol-% to 5 Mol-%, relative to epoxide groups of the at least one diepoxide (b-i).

14. The process of claim 1, wherein the epoxide composition (b) and the catalyst composition (c) are initially mixed to obtain a pre-mixture (b+c), and wherein the isocyanate composition (a) is added to the pre-mixture (b+c).

15. The process of claim 1,
  wherein the process is a bulk process, or
  wherein reacting the isocyanate composition (a) and the epoxide composition (b) in the presence of the catalyst composition (c) is done in a solvent.

16. The process of claim 15, wherein the solvent comprises one or more polar aprotic solvents.

17. The process of claim 15, wherein the solvent is selected from the group consisting of 1,3-dimethyl-2-imidazolidinon (DMI); dichlorobenzene; 1, 2, 3-trichlorobenzene; 1, 2, 4-trichlorobenzene; 1,3,5-trichlorobenzene; sulfolane; mesitylene; N-methyl pyrrolidone; 4-formyl morpholine; tert-butyl pyrrolidin-2-on; N-butyl pyrrolidone; and a mixture of two or more thereof.

* * * * *